March 5, 1963   C. C. FRANCISCO, SR   3,079,893
ANIMAL SCRATCHING AND OILING DEVICE
Filed Nov. 2, 1960   2 Sheets-Sheet 1
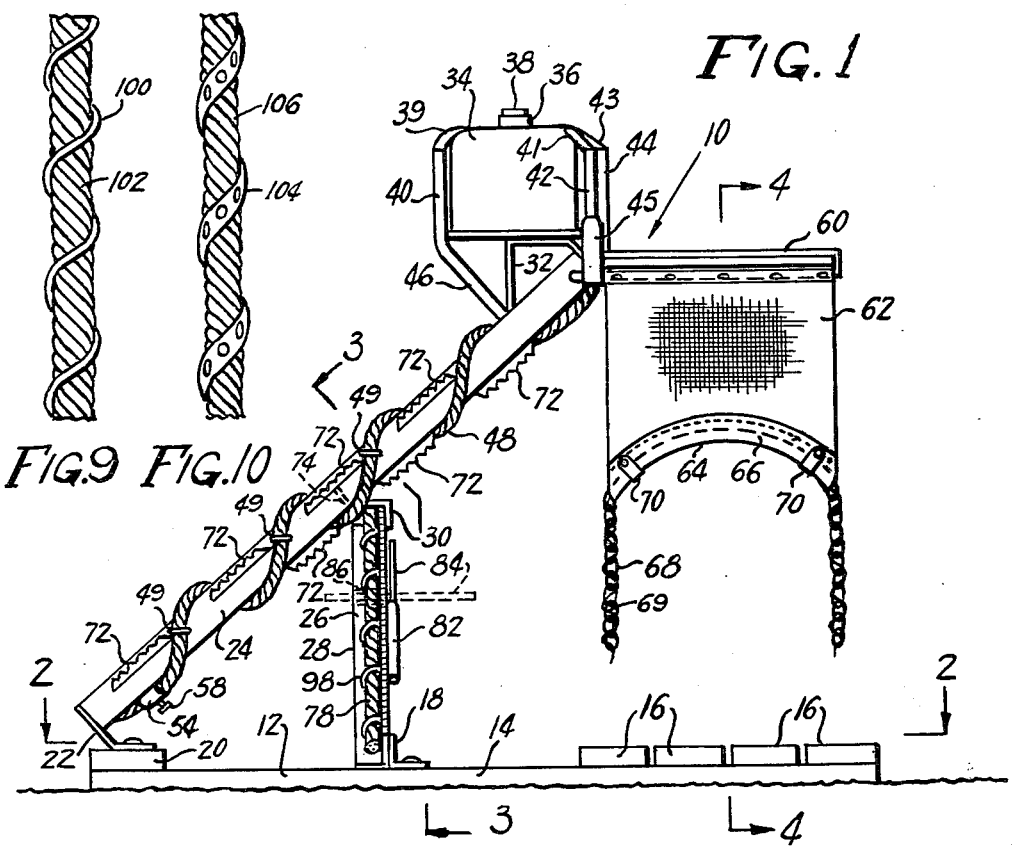
FIG. 1
FIG. 9  FIG. 10
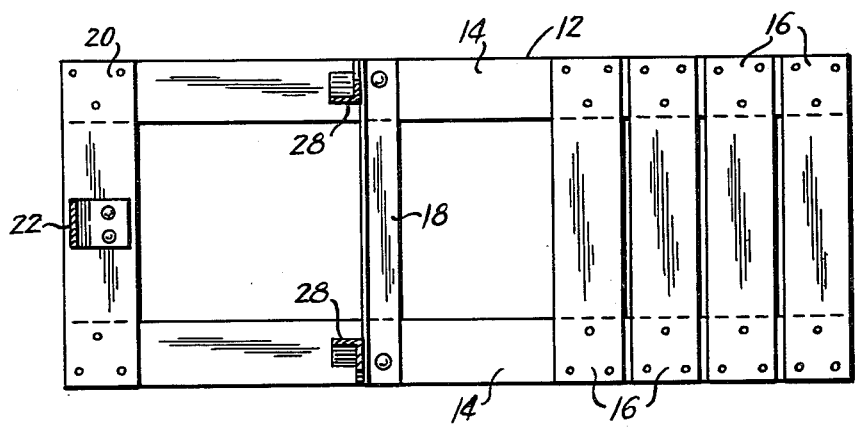
FIG. 2
INVENTOR.
CHARLES C. FRANCISCO, SR.
BY
Gustave Miller
ATTORNEY March 5, 1963
C. C. FRANCISCO, SR
3,079,893
ANIMAL SCRATCHING AND OILING DEVICE
Filed Nov. 2, 1960
2 Sheets-Sheet 2
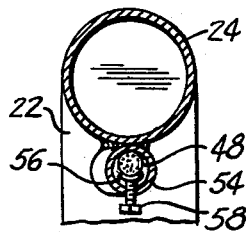
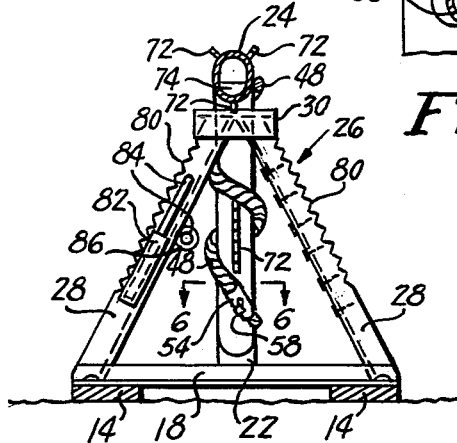
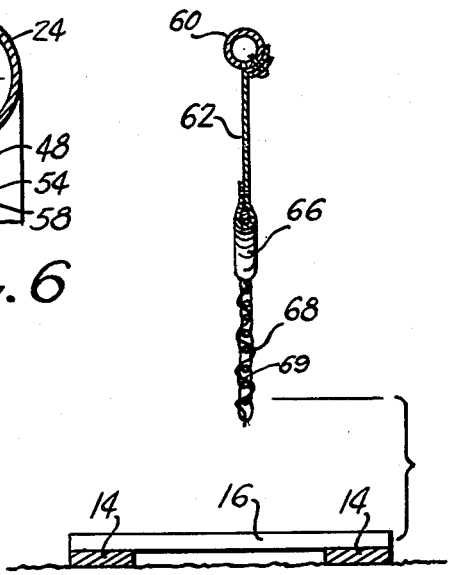
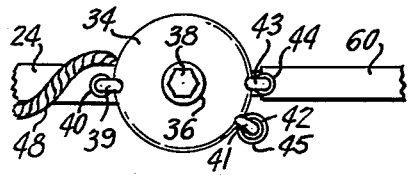
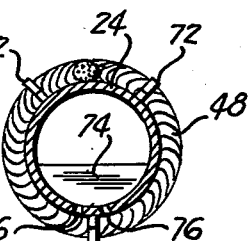
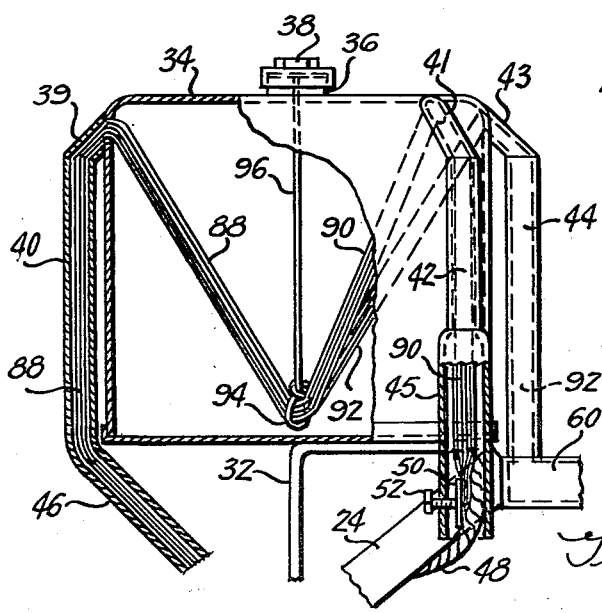
INVENTOR.
CHARLES C. FRANCISCO, SR.
BY
Gustave Miller
ATTORNEY 3,079,893
ANIMAL SCRATCHING AND OILING DEVICE
Charles C. Francisco, Sr., P.O. Box 465, Paul, Idaho
Filed Nov. 2, 1960, Ser. No. 66,845
6 Claims. (Cl. 119—157)

This invention relates to a device for treating animals such as cattle and the like, and it particularly relates to a device for scratching and oiling such animals.

A major problem in the raising of cattle and similar stock has always been the economic loss caused by insects such as grubs, flies, lice and the like. It has been found that an effective manner of controlling these pests has been to provide a device which will attract the animals thereto for the purpose of scratching themselves. The device is provided with means to apply insecticide mixed with oil to the bodies to the animals while they engage in scratching.

Although various types of scratching and oiling devices of the aforesaid type have heretofore been provided, none of these prior devices has been capable to supplying the desired amount of oil on the scratching or rubbing elements at all times and without undue waste of insecticide and oil.

Furthermore, few of these prior devices have provided an adequate scratching and oiling area to accommodate a large number of animals regardless of the size. In addition, these prior devices have, in general, either been overly bulky and clumsy to install and maintain, or have been inadequately constructed to bear the heavy pressures of ponderous and weighty animals pushing and shoving.

This cattle-scratcher and oiler provides rubbing elements, carrying the oil and insecticide to all structural members. This is desirable as it will result in more effective control of livestock pests. This unit puts the oil and insecticide on the belly, brisket and underline, where lice deposit their eggs.

It is one object of the present invention to overcome the above and other defects of the prior art by providing a scratching aid oiling device which is steady, yet not overly bulky, and which provides an adequate amount of oil at all times and under all conditions and without excessive waste.

Another object of the present invention is to provide a scratching and oiling device which provides adequate treating areas for as many as six (6) animals at a time.

A further object of this invention is to provide a wick means for continuously replenishing the oil to the oiling device from a suitably located oil reservoir or tank.

Another object of the present invention is to provide a scratching and oiling device of the aforesaid type which not ony effectively scratches and oils the animals, but also grooms them, removes excess hair and greatly improves their general market appearance.

Other objects of the present invention are to provide an improved scratching and oiling device of the character described, that is easily and economically produced, which is sturdy in construction, incorporates no moving parts and which is highly efficient in operation.

With the above and related objects in view, this invention consists in the details of construction and combination of parts, as will be more fully understood from the following description, when read in conjunction with the accompanying drawings, in which:

FIG. 1 is a side elevational view of a device embodying the present invention.

FIG. 2 is a sectional view of the device taken on line 2—2 of FIG. 1.

FIG. 3 is a sectional view taken on line 3—3 of FIG. 1, showing the A member.

FIG. 4 is a sectional view taken on line 4—4 of FIG. 1.

FIG. 5 is a cross-sectional view of the main pipe at the area of its junction with the A member.

FIG. 6 is a cross-sectional view of the main pipe and clamping member adjacent its lower end, taken on line 6—6 of FIG. 3.

FIG. 7 is an enlarged top view of FIG. 3.

FIG. 8 is a side view, partly in section and partly in elevation, of the oil tank or reservoir.

FIG. 9 and FIG. 10 are each fragmentary elevational views of alternate forms of ropes.

Referring in gretaer detail to the drawings, wherein similar reference characters refer to similar parts, there is shown a scratching and oiling device, generally designated 10, comprising a wooden platform 12 consisting of longitudinal rails 14 having wood cross beams 16 at one end, a support angle-iron cross rail 18 adjacent the center and a support wood cross beam 20 at the opposite end.

A main pipe member 24 is provided at the lower end thereof, with a bent metal strap 22 which is bolted to beam 20 and supports the lower end of the main pipe 24. The pipe 24 extends diagonally upward and is supported at its median portion by an A-frame 26. The A-frame 26 comprises opposed, diagonally extending angle-irons 28 extending to an apex constituted by a bridge member 30.

At its upper end, the pipe 24 is provided with an inverted L-shaped bracket 32. Supported on this bracket 32 is an oil reservoir or tank 34 having a filling neck 36 closed by a cap 38. Extending from one side of the upper portion of the tank 34 is a straight, relatively narrow conduit 39 extending angularly to fit into a wider vertical conduit 40, while from the upper end of the other side extend two angularly positioned relatively narrow, straight conduits 41 and 43 which lead to respective vertical conduits 42 and 44. The conduit 40 has a downwardly extending angular portion 46 which leads into the pipe 24.

The conduit 42 is provided with an enlarged lower portion 45 which is open at its lower end. Into this open lower end extends the upper end of a rubbing rope 48, of about one inch in diameter. This upper end of the rope 48 is releasably held in position by a clamp 50 (see FIG. 8) having a knob 52 in threaded engagement with an aperture in the conduit wall. The rope 48 is then helically coiled around the outside of the pipe 24 (as best shown in FIG. 1) secured at spaced points 49 on pipe 24, and its lower end is held within a sleeve or collar 54 by a clamp 56 having a knob 58 in threaded engagement with a hole in the sleeve 54 (as best seen in FIG. 6).

The conduit 44 is in fluid connection with a pipe 60 having closed ends and a longitudinal slot. A heavy canvas sheet 62 has its upper edge clamped in said longitudinal slot and hangs freely therefrom. The lower edge of the sheet 62 is concave, as at 64, and folded over to form a loop 66. A heavy chain 68, intertwined with a rope wick element 69, passes through the loop 66 and has its ends suspended from either end of the loop 66 (as best shown in FIG. 1). The chain 68 is held in place within the loop 66 by metal straps 70. The rope wick element 69 is wrapped about the chain 68 within the loop 66 so as to cushion the chain 68 and prevent direct contact of chain 68 and canvas sheet 62 within loop 66, thus preventing undue wear of the canvas sheet 62 and prolonging its life.

The pipe 24 is provided on its exterior with toothed curry bars 72 arranged in three circumferentially offset rows of spaced bars, the coils of the rope 48 extending between the spaced curry bars 72. Within the pipe 24 is provided a baffle wall 74 in the vicinity of the apex of the A-member 26. Adjacent to and upstream from the baffle wall 74, the pipe 24 is provided with openings 76 which direct liquid flowing down through the pipe 24, out of pipe 24, and behind the bridge member 30 onto the apex portion of a rope 78 having opposed V-extending arms, one arm being held within the channel of each angle-iron 28 of A-frame member 26 (as shown in FIG. 1).

The A-frame member 26 is also provided with curry means in the form of teeth 80 on each angle bar 28. One of these bars 28 is further provided with a step means comprising a tubular holder 82 secured thereto, in which is releasably held a removable bar 84. This bar 84, when not in use, is set into the holder 82 (as shown in FIGS. 1 and 3). When it is desired to provide a step to reach the tank 34 or other upper sections of the device, the bar 84 is placed transversely through horizontal step bar pipe bracket 86, open at both its ends, to form a step as shown in dash outline in FIG. 1.

The conduits 40, 42 and 44 are fed with liquid from the tank 34 by individual wicks respectively indicated at 88, 90 and 92. These wicks 88, 90 and 92 are releasably held at a common meeting point by a ring 94 at the lower end of a rod or wire 96 extending from the cap 38.

In operation, the tank 34 is filled with oil containing the appropriate type of insecticide. This oil-insecticide mixture is carried by the three wicks and housed by conduits 40, 42 and 44 to the pipe 24, rope 48 and pipe 60, respectively. The liquid then passes from pipe 24 onto the V-shaped rope 78 on the A-frame member 26, while the rope 48 is itself impregnated with the liquid. The liquid passing into pipe 60 passes onto sheet 62 which, itself, acts as a wick to bring the liquid to the chain 68 and the wick intertwined therewith.

Cattle or other animals are attracted to the device and rub themselves against the curry bars on the pipe 24 and A-frame member 26. They also pass beneath the concave lower end of sheet 62 and between the dangling ends of chain 68, where they rub both on the sheet and on the dangling chain ends. While they rub, the oil-insecticide mixture is brushed onto the animals and, as the liquid is rubbed off, it is automatically and continuously replenished by the corresponding wick action.

Although the rope rubbing element may be a simple rope such as shown at 48, it may also be reinforced. Such reinforcement is shown at 98 in FIG. 1, this reinforcement 98 being in the form of a wire coiled around the V-shaped rope 78. Such wire reinforcement is also shown in enlarged detail and applied to any type of rope in FIG. 9 where a wire 100 is shown coiled around the rope 102. Similarly, in FIG. 10, a perforated metal strap 104 is shown coiled around a rope 106.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. An animal scratching and oiling device comprising a supporting platform, first, second and third frame members on said platform, rope rubbing means on each of said frame members, a tank in fluid connection with said rope rubbing means, and rigid rubbing elements adjacent said rope means, said first frame member being an inclined pipe, said second frame member being an A-frame mounted on said platform and supporting said inclined pipe at its intermediate portion, and said third frame member being a lateral pipe extending from said inclined pipe, said inclined pipe having a plurality of rows of spaced serrated curry bars extending longitudinally thereof and constituting said rubbing elements thereon, the corresponding rope rubbing means being a rope helically coiled around the external circumference of said inclined pipe and having one end in fluid connection with said tank through a corresponding wick, said second frame member comprising an A-frame formed of opposed angle bars with an inverted V-shaped rope extending down either arm thereof from the apex, said apex being adjacent said inclined pipe, aperture means in said inclined pipe adjacent said apex, and said lateral pipe having a longitudinal slot in which is positioned one end of a fabric sheet having a chain extending along its opposite edge, said chain having dangling ends.

2. The device of claim 1, said rope rubbing means comprising rope elements.

3. The device of claim 1, said rope rubbing means comprising rope elements, each having a wire helically wound thereon.

4. The device of claim 1, said rope rubbing means comprising rope elements, each having a perforated metal strap helically wound thereon.

5. An animal scratching and oiling device comprising a supporting platform, an inclined main pipe having its lower end connected to said platform, an A-frame supporting its intermediate section and a tank at its upper end, a plurality of rows of serrated curry bars on the exterior of said pipe, a rope helically coiled around said pipe and having its upper end in operative engagement with a wick, said wick being in fluid connection with said tank, an auxiliary pipe extending laterally from the upper end of said main pipe, said auxiliary pipe and said main pipe both being in fluid connection with said tank, said main pipe having a fluid outlet leading to said A-frame, a rope on said A-frame in a position to receive fluid from said fluid outlet of said main pipe, curry teeth on said A-frame, and a canvas sheet having one edge in fluid connection with said auxiliary pipe, the opposite edge of said sheet being provided with a chain having dangling ends.

6. The device of claim 5, and separate conduits connecting said main pipe, said auxiliary pipe and the rope on said main pipe to said tank, each of said separate conduits having a wick positioned therein, each wick having one end positioned in said tank, and movable means for retaining said wick ends in said tank.

References Cited in the file of this patent

UNITED STATES PATENTS

| | | |
|---|---|---|
| 1,999,122 | Clark et al. | Apr. 23, 1935 |
| 2,768,608 | Anderson | Oct. 30, 1956 |
| 2,777,421 | Hiebert | Jan. 15, 1957 |
| 2,814,272 | Worden | Nov. 26, 1957 |